(12) United States Patent
Nguyen et al.

(10) Patent No.: US 6,981,560 B2
(45) Date of Patent: Jan. 3, 2006

(54) METHOD AND APPARATUS FOR TREATING A PRODUCTIVE ZONE WHILE DRILLING

(75) Inventors: Philip D. Nguyen, Duncan, OK (US); Michael Sanders, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 298 days.

(21) Appl. No.: 10/613,487

(22) Filed: Jul. 3, 2003

(65) Prior Publication Data

US 2005/0000731 A1    Jan. 6, 2005

(51) Int. Cl.
*E21B 17/18*    (2006.01)

(52) U.S. Cl. .......................... 175/70; 175/64; 175/72; 175/230; 175/306; 175/325.2; 507/219; 507/220; 507/221

(58) Field of Classification Search ....... 175/64–66,70, 175/72, 215, 230, 305, 306, 325.2; 507/219–221
See application file for complete search history.

(56) References Cited

U.S. PATENT DOCUMENTS

| | | | |
|---|---|---|---|
| 5,309,997 A | 5/1994 | Nahm et al. ................ 166/292 |
| 5,743,345 A | 4/1998 | Hollar et al. ............... 174/401 |
| 5,911,282 A | 6/1999 | Onan et al. .................... 175/72 |
| 5,944,105 A * | 8/1999 | Nguyen ....................... 166/278 |
| 5,957,226 A | 9/1999 | Holte .......................... 175/320 |
| 6,260,622 B1 | 7/2001 | Blok et al. ............... 166/305.1 |
| 6,481,501 B2 * | 11/2002 | Chavez et al. .............. 166/285 |
| 6,497,290 B1 * | 12/2002 | Misselbrook et al. ....... 166/384 |
| 6,877,571 B2 * | 4/2005 | Hughes et al. ................ 175/57 |

* cited by examiner

*Primary Examiner*—Zakiya Walker
(74) *Attorney, Agent, or Firm*—Robert A. Kent; Baker Botts

(57) ABSTRACT

A method and apparatus for delivering a well treatment fluid to a productive zone of a subterranean formation at the same time that a well bore is being drilled is provided. The method includes the steps of delivering a drill-in fluid to a drill bit drilling a well bore in, or adjacent to, the productive zone; removing drill cuttings from the well bore; and simultaneous with these steps injecting the treatment fluid into the productive zone. The apparatus includes at least three nested tubes, which form one internal flow path and two annuluses. The drill-in fluid and drill cuttings are delivered to, and removed from, the drill bit, respectively, through the internal flow path and one of the two annuluses. The treatment fluid is delivered to the subterranean formation through the remaining annulus and an expandable bladder mounted to the intermediate and outer tubes.

31 Claims, 7 Drawing Sheets

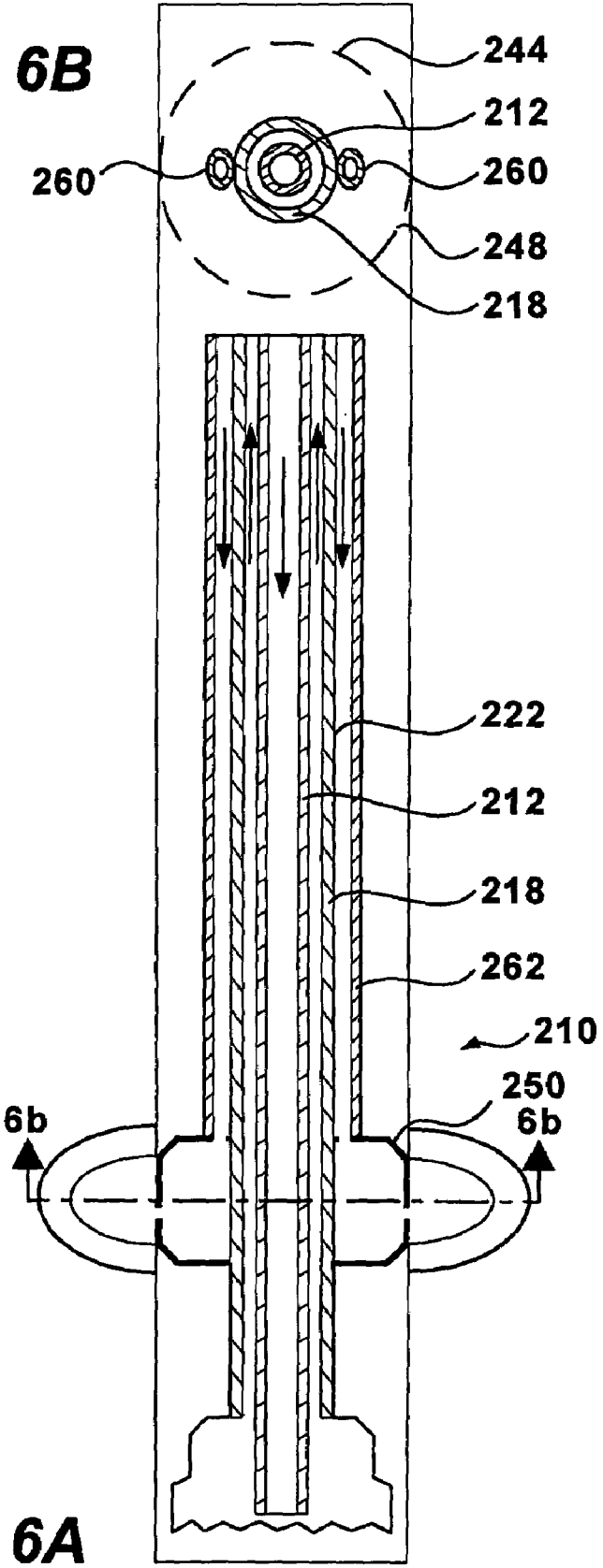

METHOD AND APPARATUS FOR TREATING A PRODUCTIVE ZONE WHILE DRILLING

BACKGROUND OF THE INVENTION

The present invention relates to a method, apparatus and composition for treating subterranean well formations, and more specifically, to an improved method and apparatus for treating a productive zone while drilling.

Hydrocarbon producing wells are often completed in unconsolidated formations containing loose and incompetent particulate solids which migrate with hydrocarbons or hydrocarbons and water produced by the wells. The presence of the particulate solids in the produced fluids is highly undesirable in that the solid particles abrade tubular goods, pumping equipment, valves and other producing equipment and reduce the fluid production capabilities of the producing zones in the wells. Incompetent subterranean formations include those which contain loose particulate solids that are readily entrained by produced fluids and those wherein the particulate solids making up the formations are bonded together with insufficient strength to withstand the forces produced by the production of fluids from the formations. A technique which is often used for minimizing particulate solid production from unconsolidated formations has been to produce fluids from the formations at low flow rates whereby the near well stabilities of particulate solid bridges and the like in the formations are preserved. However, the collapse of such particulate solid bridges often occurs as a result of unintentional high production rates and/or pressure cycling. Pressure cycling occurs from frequent shut-ins and start-ups of a well. The frequency of the pressure cycling is very critical to the longevity of the near well formation, especially during the depletion stage of the well when the pore pressure of the formation has already been significantly reduced.

To alleviate this problem, a number of solutions have been proposed. One such solution involves gravel packing the annulus between the well bore wall and sand control screens and the like, with sized sand or gravel to ensure that formation particulate solids are not produced during production of hydrocarbons. However, because gravel packs and sand screens filter out particulate solids from the produced fluids, the presence of the filtered particulate solids adds to the flow resistance thereby producing additional pressure draw down which causes portions of the unconsolidated formations to break down.

Another solution involves treating the subterranean formation with a consolidation agent, which functions to solidify the subterranean formation thereby improving its structural integrity. More specifically, the treatment method involves introducing the consolidation agent into the pore spaces of the formation in the vicinity of the well bore. Before the consolidating agent becomes hardened or cured, the excess consolidating agent in the pore space must be displaced by an overflush fluid to help retain the original permeability of the reservoir formations as high as possible.

There are a number of tools that have been proposed for introducing the consolidation agent into the pore spaces of the formation. Known tools generally comprise a pair of axially spaced packers, which define an annular space via which the treatment fluid is injected into the surrounding perforations. A limitation of such tools is that they are designed to inject a batch of treatment fluid over a limited length interval via perforations in the formation. If parts of the formation surrounding perforations at different levels in a well are to be treated, then the tool is moved to another level and the injection of a batch of treatment fluid is repeated once the tool has been positioned adjacent the perforations. In addition, to regain the permeability of the formations after the placement of the treatment fluid such as consolidating agent, a separate operation of overflush fluid placement must be followed to displace the consolidating agent occupying the pore space within the matrix of the formation before the material begins to cure.

At least one solution has been proposed to inject treatment fluids, such as sand consolidation agents, stimulation chemicals and/or overflush fluids over a long interval into a formation surrounding an underground well bore. The tool according to this invention comprises a tool body, which defines a longitudinal axis that extends in use in a longitudinal direction within an underground well bore; at least three axially spaced swab assemblies, which are carried by the tool body such that in use at least two axially spaced annular spaces are formed between the tool body and the well bore; and at least two treatment fluid supply conduits, which are each connectable in fluid communication with one of the annular spaces. This configuration forms at least two separate regions through which the consolidation fluid and other treatment fluids can be introduced into the formation. It thus enables the simultaneous injection of multiple treatment fluids into the formation, which in turn increases the efficiency with which the formation can be consolidated or otherwise treated. While it allows multiple treatment solutions to be injected into the formation over any length, it does so only after the well bore has been drilled, and therefore requires at least two sequential operations to drill the well bore and treat the formation.

Thus, there is a need for an improved method of completing wells in unconsolidated subterranean zones whereby the migration of formation fines and sand with produced fluids can be economically and permanently prevented while allowing the efficient production of hydrocarbons from the unconsolidated producing zone.

SUMMARY OF THE INVENTION

The present invention provides subterranean formation treating methods and tools, which meet the needs described above and overcome the deficiencies of the prior art.

In one embodiment, the present invention provides a method for delivering a treatment fluid to an interval of a subterranean formation while drilling. The method includes the steps of delivering a drill-in fluid to a drill bit drilling a well bore in, or adjacent to, the interval; removing drill cuttings from the well bore; and injecting the treatment fluid into the interval simultaneously with the steps of delivering the drill-in fluid to the drill bit and removing the drill cuttings from the well bore.

In the another method according to the present invention, a second treatment fluid is injected into the interval following the step of injecting the first treatment fluid into the interval and simultaneously with the steps of delivering the drill-in fluid to the drill bit and removing the drill cuttings from the well bore. In a preferred embodiment, the first treatment fluid injected into the formation is a consolidation agent and the second treatment fluid injected into the formation is an overflush fluid.

In another embodiment, the present invention provides an apparatus for delivering a treatment fluid to an interval of a subterranean formation while drilling. The apparatus comprises at least three nested tubes. The first tube is defined by an inner flow path and an outer surface and is coaxially disposed within the second tube. The second tube is defined by an inner surface and an outer surface and is coaxially disposed within the third tube. A first annulus is formed between the outer surface of the first tube and the inner surface of the second tube. The third tube is defined by an inner surface and an outer surface. A second annulus is formed between the outer surface of the second tube and the inner surface of the third tube. The apparatus further comprises an expandable bladder coupled to the outer surface of the second tube and an end of the third tube.

In a preferred embodiment, the apparatus according to the present invention comprises at least four nested tubes. This embodiment enables the present invention to deliver at least two treatment fluids to the zone. In this embodiment, the fourth tube is defined by an inner surface and an outer surface and the third tube is coaxially disposed within the fourth tube. A third annulus is formed between the outer surface of the third tube and the inner surface of the fourth tube. The apparatus further comprises a second expandable bladder coupled to the outer surface of the third tube and an end of the fourth tube.

In another embodiment according to the present invention, the apparatus for delivering a treatment fluid to an interval of a subterranean formation while drilling employs two pairs of oppositely disposed conduits in place of the third and fourth tubes to deliver the treatment fluid to the interval of the subterranean formation. In this embodiment, the first and second coaxially disposed tubes are also employed. The difference is that the two pairs of oppositely disposed conduits are mounted to the outer surface of the second tube. One of the expandable bladders is secured to an end of each conduit of one of the pairs and the outer surface of the second tube. The other expandable bladder is secured to an end of each conduit of the other pair of opposite disposed conduits and the outer surface of the second tube. The expandable bladders in this embodiment are also axially disposed from one another. The pairs of oppositely disposed conduits are preferably offset from one another by approximately 90 degrees. The consolidation agent may be delivered to the interval of the subterranean formation through one of the pairs of conduits and the overflush fluid may be delivered behind the consolidation agent through the other pair of conduits. Alternatively, a single treatment fluid may be delivered to different intervals of the formation simultaneously through both pairs of conduits.

It is, therefore, a general object of the present invention to provide improved subterranean formation treatment methods and tools.

Other and further objects, features and advantages of the present invention will be readily apparent to those skilled in the art upon a reading of the description of preferred embodiments which follows.

BRIEF DESCRIPTION OF THE DRAWINGS

The present invention is better understood by reading the following description of non-limitative embodiments with reference to the attached drawings wherein like parts of each of the several figures are identified by the same referenced characters, and which are briefly described as follows:

FIG. 6A is a cross-sectional view of the apparatus shown in FIG. 4 taken along line 6A—6A, which illustrates injection of a second treatment fluid into an interval of a subterranean formation while drilling.

FIG. 6B is a cross-sectional view of the apparatus shown in FIG. 6A taken along line 6B—6B and also illustrating another pair of conduits utilized in this embodiment of the invention.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

Figures 1A, 1B:
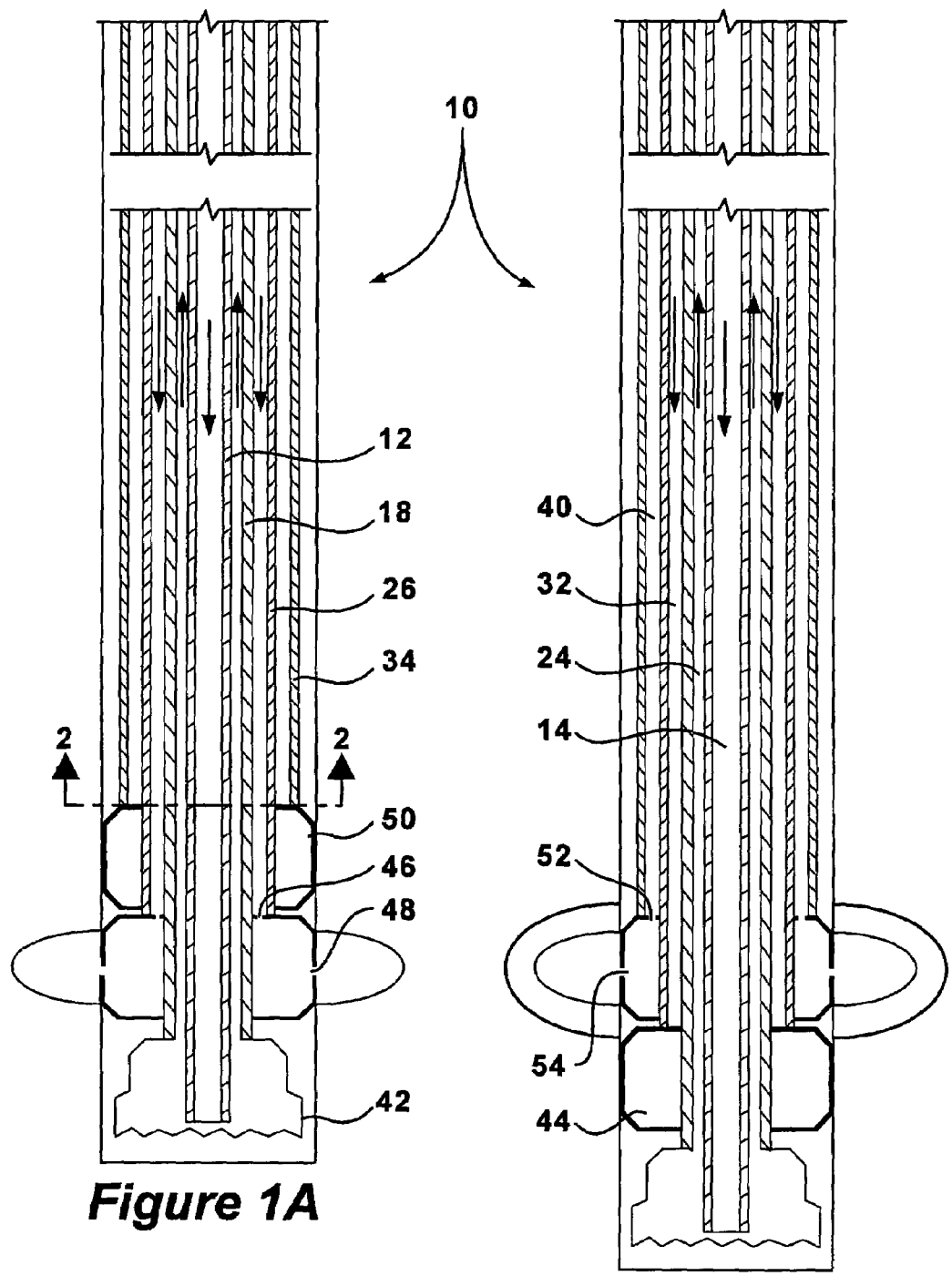
FIG. 1A is schematic diagram of an apparatus according to the present invention illustrating the injection of a consolidation agent into an interval of a subterranean formation while drilling.
FIG. 1B is a schematic diagram of the apparatus shown in FIG. 1A illustrating the injection of an overflush fluid into the interval behind the consolidation agent.
Figure 2:
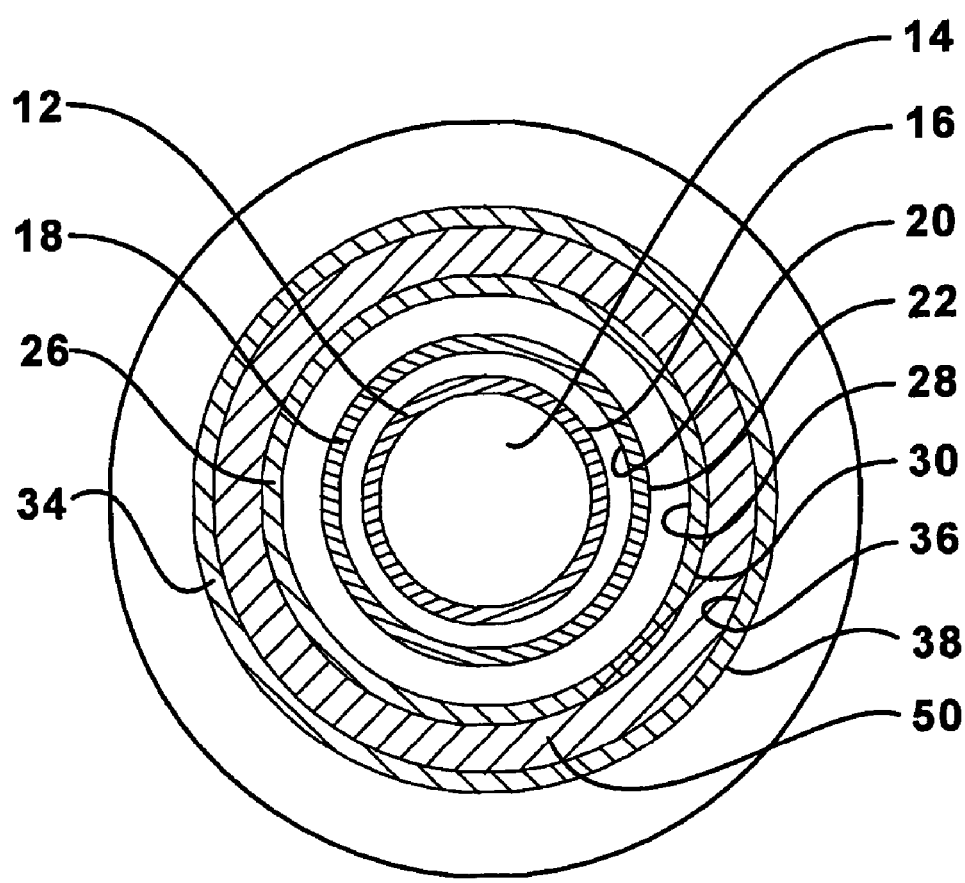
FIG. 2 is a cross-sectional view of the apparatus shown in FIG. 1A taken along line 2—2.

The details of the present invention will now be discussed with reference to the figures. Turning to FIG. 1A, a drill pipe assembly for treating an interval of a subterranean formation (usually a productive zone) while drilling a well bore in the interval is illustrated generally by reference numeral 10. The drill pipe assembly 10 comprises a first tube 12, which is preferably formed of a cylindrically-shaped metal drill pipe. The first tube 12 is defined by an inner flow path 14 and outer surface 16, as shown in FIG. 2. The inner flow path 14 is adapted to deliver a fluid down through the first tube 12.

The drill pipe assembly 10 further comprises a second tube 18. The second tube 18 is also preferably formed of a cylindrically-shaped metal drill pipe, which is defined by an inner surface 20 and an outer surface 22, as shown in FIG. 2. The first tube 12 is coaxially disposed within the second tube 18. The diameter of the outer surface 16 of the first tube 12 is smaller than the diameter of the inner surface 20 of the second tube 18. Consequently, a first annulus 24 is formed between the outer surface 16 of the first tube 12 and the inner surface 20 of the second tube 18, as shown in FIG. 1B. The first annulus 24 is adapted to deliver a fluid down hole through the drill pipe assembly 10.

In one embodiment of the present invention, a drill-in fluid is pumped down hole through the inner flow path 14 and drill cuttings mixed with the spent drill-in fluid are removed from the well bore through the first annulus 24, as shown in FIG. 1A. In an alternate embodiment of the present invention, the drill-in fluid is pumped down hole through the first annulus 24 and the drill cuttings and spent drill-in fluid are removed from the well bore through the inner flow path 14.

The drill pipe assembly 10 further comprises a third tube 26, as shown in FIGS. 1 and 2. The third tube 26 is also preferably formed of a cylindrically-shaped metal drill pipe. The third tube 26 is defined by an inner surface 28 and an outer surface 30, as shown in FIG. 2. The first and second tubes 12 and 18 are coaxially disposed within the third tube 26. Furthermore, the diameter of the inner surface 28 of the third tube 26 is larger than the diameter of the outer surface 22 of the second tube 18, as shown in FIG. 1B. Consequently, a second annulus 32 is formed between the inner surface 28 of the third tube 26 and the outer surface 22 of the second tube 18. The second annulus 32 is adapted to communicate a treatment fluid down hole, as shown by the directional arrows in FIGS. 1A and 1B. In a preferred embodiment of the present invention, the treatment fluid communicated down hole through the second annulus 32 is a consolidation agent.

The drill pipe assembly 10 further comprises a fourth tube 34, as shown in FIG. 1A. The fourth tube 34 is also preferably formed of a cylindrically-shaped metal drill pipe. The fourth tube 34 is defined by an inner surface 36 and an outer surface 38, as shown in FIG. 2. The first, second and third tubes 12, 18 and 26 are all coaxially disposed within the fourth tube 34. Furthermore, the inner surface 36 of the fourth tube 34 is larger than the outer surface 30 of the third tube 26. Consequently, a third annulus 40 is formed between the outer surface 30 of the third tube 26 and the inner surface 36 of the fourth tube 34, as shown in FIG. 1B. The third annulus 40 is adapted to communicate a second treatment fluid from the well surface to the interval, as shown in FIGS. 1A and 1B. In a preferred embodiment of the present invention, the second treatment fluid is an overflush fluid.

In another embodiment of the present invention, the third annulus 40 can be used as an additional flow path for delivering a desired treatment fluid to the subterranean formation. In other words, a single treatment fluid can be delivered to the subterranean formation through the second and third annuluses 32 and 40, simultaneously. This allows for delivery of the treatment fluid to the subterranean formation over an increased interval.

The drill pipe assembly 10 further includes a drill bit 42, which is secured to the ends of the first tube 12 and the second tube 18, as shown in FIGS. 1A and 1B. In one embodiment, the drill bit 42 is a rotary drill bit. In another embodiment, the drill bit 42 is a hydraulically operated drill bit such as a Dynadrill.

The drill pipe assembly 10 further comprises a first expandable bladder 44, as shown in FIGS. 1A and 1B. The first expandable bladder 44 is a generally donut-shaped member, which defines a hollow interior chamber and is preferably formed of an elastomeric material, e.g., acrylonitrile butadiene, fluoroelastomers, hydrogenated nitrile or other known equivalent material. The first expandable bladder 44 is secured to the outer surface 22 of the second tube 18 by a mechanical or chemical means_or other known equivalent securing means. The first expandable bladder 44 is also secured to an end of the third tube 26 by the same means.

The first expandable bladder 44 comprises a plurality of equally spaced communication ports 46, which are disposed along the circumferential surface of the first expandable bladder and open in communication with the second annulus 32 in response to fluid pressure. More specifically, as the treatment fluid is pumped down the second annulus 32, the communication ports 46 open allowing the treatment fluid to pass into the hollow interior chamber of the first expandable bladder 44. The first expandable bladder 44 also comprises a plurality of equally spaced exit ports 48, which are disposed along the circumferential surface of the first elastomeric bladder and open in communication with the well bore. The plurality of exit ports also open in response to fluid pressure.

The drill pipe assembly 10 further comprises a second expandable bladder 50, as shown in FIGS. 1A and 1B. The second expandable bladder 50 is also a generally donut-shaped member, which defines a hollow interior chamber and is preferably formed of an elastomeric material, e.g., acrylonitrile butadiene, fluoroelastomers, hydrogenated nitrile or other known equivalent material. The second expandable bladder 50 is secured to the outer surface 30 of the third tube 26 by an epoxy-type of glue, e.g., a mechanical or chemical means or other known equivalent securing means. The second expandable bladder 50 is also secured to an end of the fourth tube 34 by the same means.

The second expandable bladder 50 comprises a plurality of equally spaced communication ports 52, which are disposed along the circumferential surface of the second expandable bladder and open in communication with the third annulus 40 in response to fluid pressure. More specifically, as a treatment fluid is pumped down the third annulus 40, the communication ports 52 open allowing the treatment fluid to pass into the hollow interior chamber of the second expandable bladder 50. The second expandable bladder 50 also comprises a plurality of equally spaced exit ports 54, which are disposed along the circumferential surface of the second elastomeric bladder and open in communication with the well bore. The plurality of exit ports also open in response to fluid pressure. The expandable bladders 44 and 50 are effective at maintaining a sealing relationship with the well bore as the drill pipe assembly 10 is moved through the well bore.

The expandable bladders 44 and 50 can be set via weight on the drill pipe assembly 10 or via hydraulic pressure. Furthermore, the communication and exit ports 46, 52, and 48, 54, respectively, may be opened mechanically or hydraulically, e.g., by the fluid pressure. The use of nozzles to spray the formation might also be used in place of the expandable bladders. Alternatively, the use of a number of containers that contain the consolidation agent followed by containers that contain the overflush fluid can be employed. These containers could then open to the formation via a pressure surge, e.g., an explosive surge such as by a PerfCon or PowerPerf service.

In another embodiment, the drill pipe assembly 10 is used for delivering a single treatment fluid to the subterranean formation. In this embodiment, the single treatment fluid is delivered to the subterranean formation through the second and third annuluses 32 and 40, respectively, simultaneously. The simultaneous delivery of the treatment fluid through both flow paths enables the treatment fluid to be delivered over an extended interval.

Figure 3:
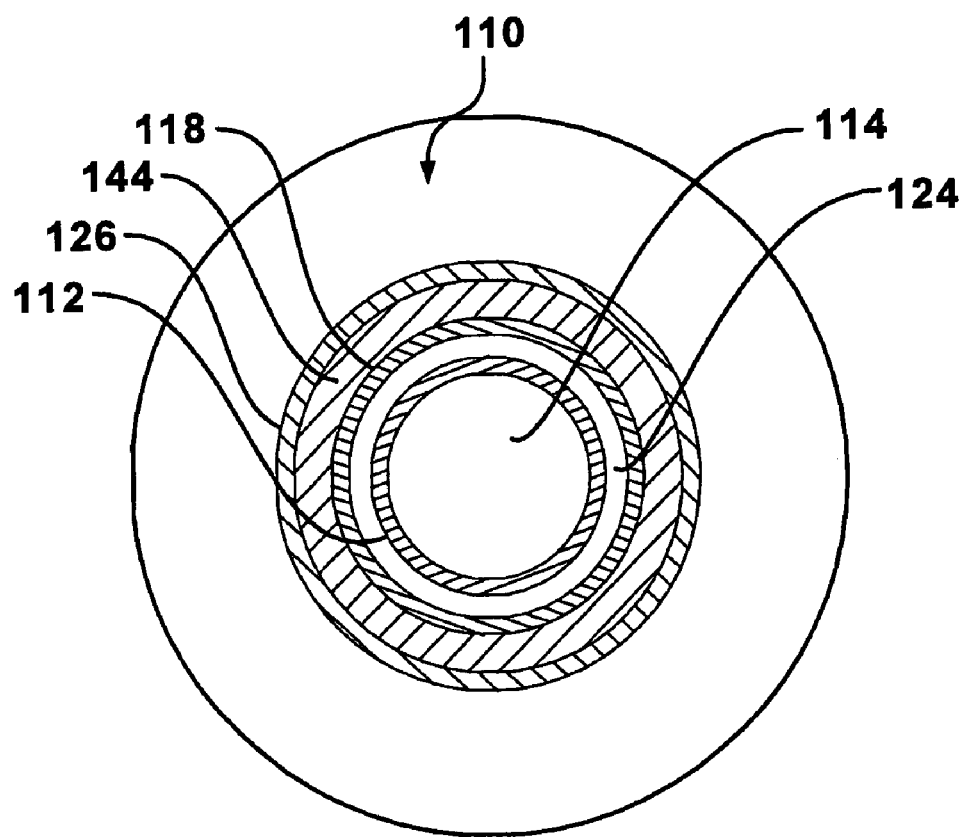
FIG. 3 is a schematic diagram of another embodiment of the present invention illustrating injection of an treatment fluid into an interval of the subterranean formation while drilling.

In another alternate embodiment, a simpler configuration for the drill pipe assembly can be used to deliver a single treatment fluid, or multiple treatment fluids sequentially, to the subterranean formation. This embodiment is shown in FIG. 3 and employs a modified version of the drill pipe assembly 110. The drill pipe assembly 110 comprises three coaxially disposed tubes (112, 118, 126) having two annuluses and one elastomeric bladder (144) rather than four coaxially disposed tubes having three annuluses and two elastomeric bladders. In such an embodiment, the drill-in fluid is pumped down hole through either the inner flow path 114 of the first tube 112 or through the first annulus 124, as described above. Similarly, the drill cuttings are removed from the well bore through the inner flow path 114 or the first annulus 124. In such an embodiment, the treatment fluid is pumped down hole through the second annulus 132 (not shown).

In another aspect of the present invention, a method is provided for consolidating a subterranean formation adjacent to the well bore while it is being drilled in a productive zone. The drill pipe assembly 10 shown in FIGS. 1 and 2 are used in this method. In one embodiment of the preferred method, the well bore is drilled for a specified distance, for example, until the production zone is reached. Then, the consolidation agent is injected into the productive zone as additional well bore is being drilled. Subsequently, the overflush is injected into the formation behind the consolidation agent. This process is repeated until the entire desired section of the interval is treated.

Preferably, the use of a fluid loss control additive in the drill-in fluid is limited so that the buildup of a filter cake on the formation wall is kept to a minimum or none at all. The lack of filter cake allows the consolidation agent and overflush fluid to penetrate freely into the formation, preferably a distance between about 0.1 to about 2 feet from the wall of the well bore.

The consolidation agent and its overflush fluid are transferred sequentially but separately within the two axially spaced annuluses 32 and 40, which because of their configuration form a front annular space and a rear annular space. The consolidation agent is delivered down hole through the second annulus 32 formed between the inner surface 28 of a third tube 26 and the outer surface 22 of the second tube 18 and the overflush fluid is delivered through the third annulus 40 formed between the inner surface 36 of the fourth tube 34 in the outer surface 30 of the third tube 26. The consolidation agent is injected into the formation via the first expandable bladder 44 through the exit ports 48. Similarly, the overflush is injected into the formation via the second expandable bladder 50 through exit ports 54, which are disposed adjacent to but behind the first expandable bladder 44, which delivers the consolidation agent. The overflush is injected to displace the consolidation agent and prevent it from occupying the pore space of the formation matrix to maintain the original formation permeability as high as possible.

In another embodiment, the formation consolidating or stabilizing agent is formulated to be part of the drill-in fluid so that the material is allowed to penetrate the formation during drilling. The overflush fluid is injected into the formation afterward via a separate container and tubular attached to the drill pipe assembly 10 to displace the consolidation agent from the pore space.

Figure 7:
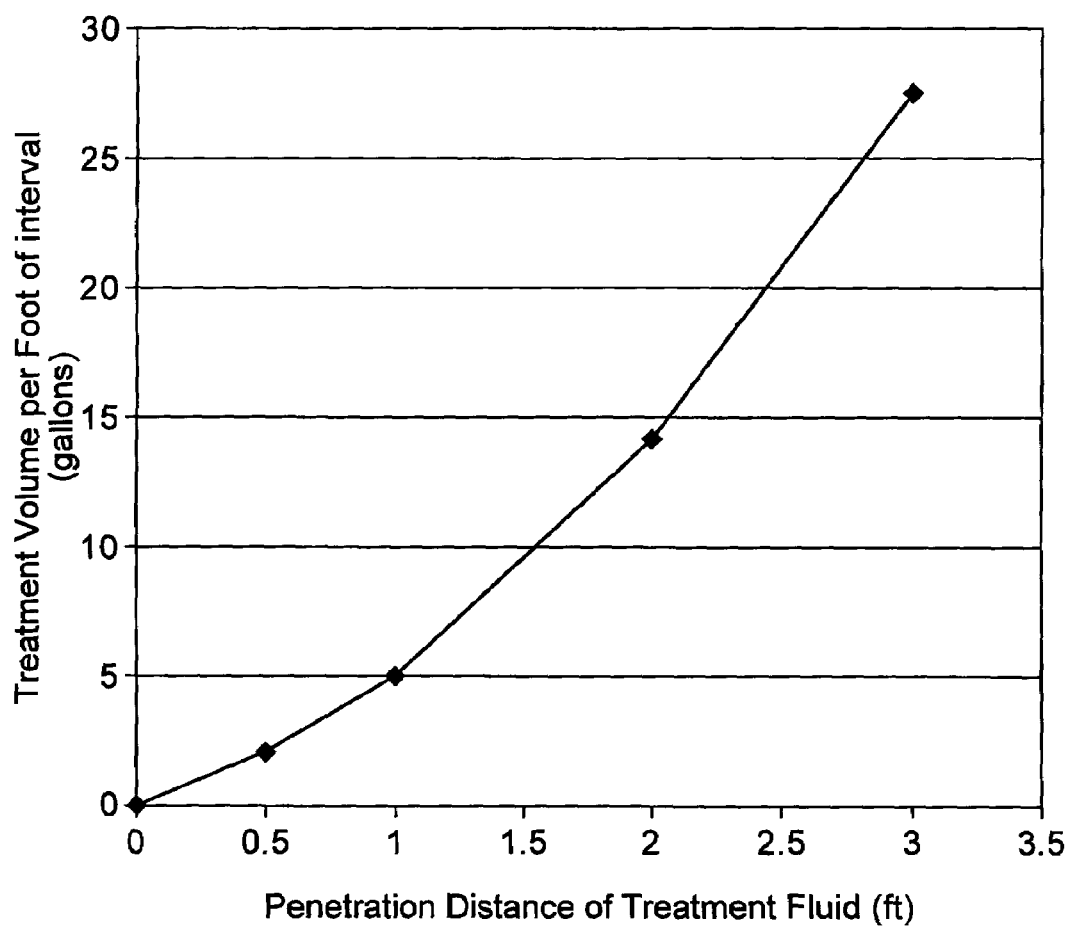
FIG. 7 is a graph illustrating the estimated volume per foot of interval that the treatment fluid fills a subterranean formation as a function of penetration depth from the well bore wall.

When the drilling process is about to be completed, the consolidation agent is displaced from the tubing and its expandable bladder 44 (into the formation) using the overflush fluid. The consolidation fluid is injected into the sand formation at matrix flow rate to saturate the sand in a zone around the well bore for a distance of 0.1 to 2 feet. It is preferred that for every one pore volume of consolidation agent injected into the formation, a minimum of one equivalent pore volume of overflush is used. FIG. 7 provides an estimate of volumes required for treating the formation area surrounding the well bore.

A completion brine containing fluid loss control additives is preferably injected into the annular space between the well bore and the drill pipe assembly 10 during the drilling operation.

The details of the preferred consolidation agent will now be described. Depending upon the temperature of the formation, the consolidation agent can be formulated to meet the temperature requirements, ranging from 60° F. to 450° F. The consolidation agent can be a curable epoxy resin system, which includes a resin component, a hardener component, a silane coupling agent and a surfactant that enhances the adhesion of the resin to the surface of sand grains and causes the resin to flow to the contact points between the sand grains. The consolidation agent is also preferably diluted with an aqueous soluble solvent, which is readily to be extracted from the resin solution once it is in contact with an aqueous overflush. The concentration ratios of resin to solvent are preferably between 1 to 0.2 in 1 to 20. The hardener acts as an internal catalyst for self-curing without the need of external catalyst.

The consolidation agent can also be phenolic resin, a furan resin, or a mixture of phenolic and furan resins. These resin systems may also include a dilulent to help obtain the desired viscosity of resin solution, a silane coupling agent, a surfactant, and optionally a flexibilizer compound to provide plasticity to the treated formation. Preferably, the consolidation agent is a one-component resin system, which is either activated by an internal activator or by temperature, so that the use of an external activator such as an acid catalyst is eliminated.

The overflush fluid is preferably a completion brine, which contains a small quantity of surfactant to ensure the wetting of the consolidation agent to the formation sand.

EXAMPLE

The following testing procedure was conducted to determine the permeability and unconfined consolidation strength (UCS) of a sample sand treated with a preferred consolidation agent and overflush fluid. First, 0.5 inches of 70/170-mesh sand was packed in the bottom of a Teflon sleeve. Next, a formation sand was packed into the Teflon sleeve, approximately 4.25 inches on top of the 70/170-mesh sand. Next, approximately 0.25 inches of 20/40-mesh sand was packed on top of the formation sand. Next, a 100-psi stress load was applied to the pack column. Next, the initial permeability of the formation sand was determined using a 5% $NH_4Cl$ brine, which includes 1% by volume of a cationic surfactant. Next, the pack column was treated with 40 ml of a diluted solution of curable epoxy resin. The diluted curable epoxy resin was formed by mixing 20 ml of curable epoxy resin with 20 ml of methanol. This volume is equivalent to two pore volumes of the pack column. Next, the pack column was flushed with 40 ml of 5% $NH_4Cl$. The pack column was then allowed to be cured at 140° F. for 48 hours. The permeability of the cured formation sand was then determined with 5% $NH_4Cl$. Cores were then obtained from the cured column of formation sand. Finally, the UCS of the consolidated cores was determined.

The results of the test are shown in Table I below:

TABLE I

| Well No. | Initial Permeability, mD | Final Permeability, mD | % Regain | UCS, psi |
|---|---|---|---|---|
| 115 | 857 | 819 | 95 | 1700 |
| 156 | 305 | 206 | 67 | 1608 |

In another embodiment, other treating agents may comprise tackifying agents, acids, gel breakers, enzymes, hydrolyzable esters, corrosion inhibitors, paraffin inhibitors, and scale inhibitors can also be applied using this new apparatus to treat the formation while drilling.

In yet another embodiment, the present invention is used for zone isolation. In such an embodiment, the drill pipe assembly 110 can be used to inject a consolidation agent into regions of the subterranean formation immediately above, below, and within the production zone itself especially with long productive interval. In such an embodiment, only the consolidation agent is injected into the subterranean formation. The overflush fluid is not injected behind the consolidation agent because the goal is to cause the subterranean formation to solidify around the well bore and thereby create regions of impermeability above, below, and with the production zone which, in turn, creates zones of isolation. This procedure may be repeated over numerous zones throughout the subterranean formation along the long well bore to divide the productive zone into multiple isolated, short intervals for production management purpose. The drill pipe 10 can also be used for this application. In this application, the consolidation agent is delivered to the subterranean formation through the second annulus 32 and third annulus 40. Indeed, the consolidation agent can be pumped into the subterranean formation through both annuluses simultaneously. This, in turn, allows a larger interval over which the consolidation agent can be injected into the subterranean formation.

Figure 4:
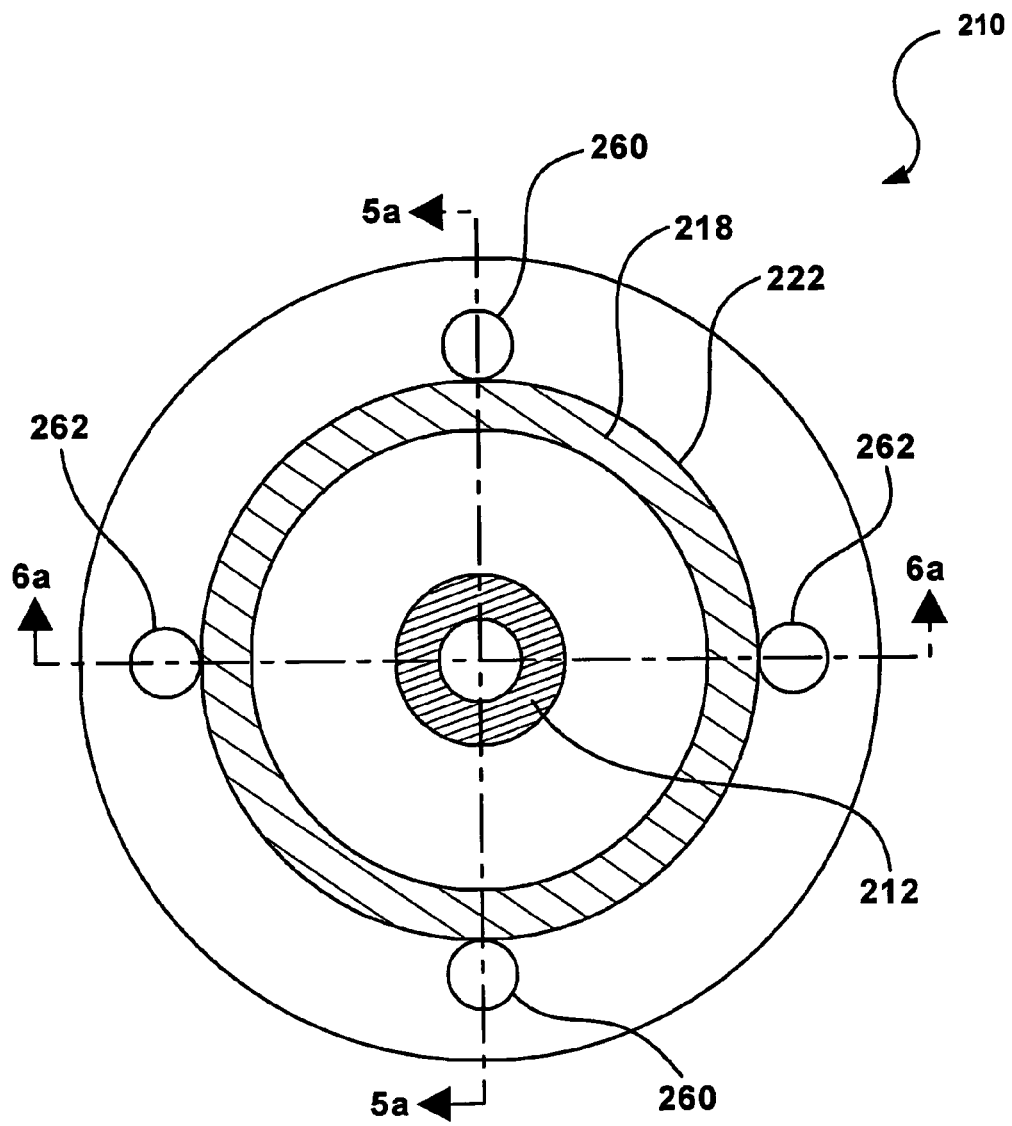
FIG. 4 is a schematic diagram of another embodiment of an apparatus for delivering treatment fluid to an interval of a subterranean formation according to the present invention.

Yet another embodiment of the present invention is illustrated in FIGS. 4–6. This embodiment of the present invention referred to generally by reference number 210 utilizes two pairs of oppositely disposed conduits 260, 262 secured to the outer surface 222 of the second tube 218 to deliver the treatment fluid to the expandable bladders 244, 250 in place of the second and third annuluses. The first pair of oppositely disposed conduits 260 comprises two conduits disposed approximately 180 degrees apart from one another, as shown in FIG. 4. The second pair of conduits 262 also comprises two conduits disposed approximately 180 degrees apart from one another, as shown in FIG. 4. The first pair of conduits 260 is circumferentially offset from the second pair of conduits 262 by approximately 90 degrees, as shown in FIG. 4. Although not apparent from FIG. 4, the first pair of conduits 260 is also axially offset from the second pair of conduits 262. All four conduits in both pairs 260, 262 are secured to the outer surface 222 of the second tube 218 by welding the conduits to the surface or by any other known equivalent methods.

Figures 5A, 5B:
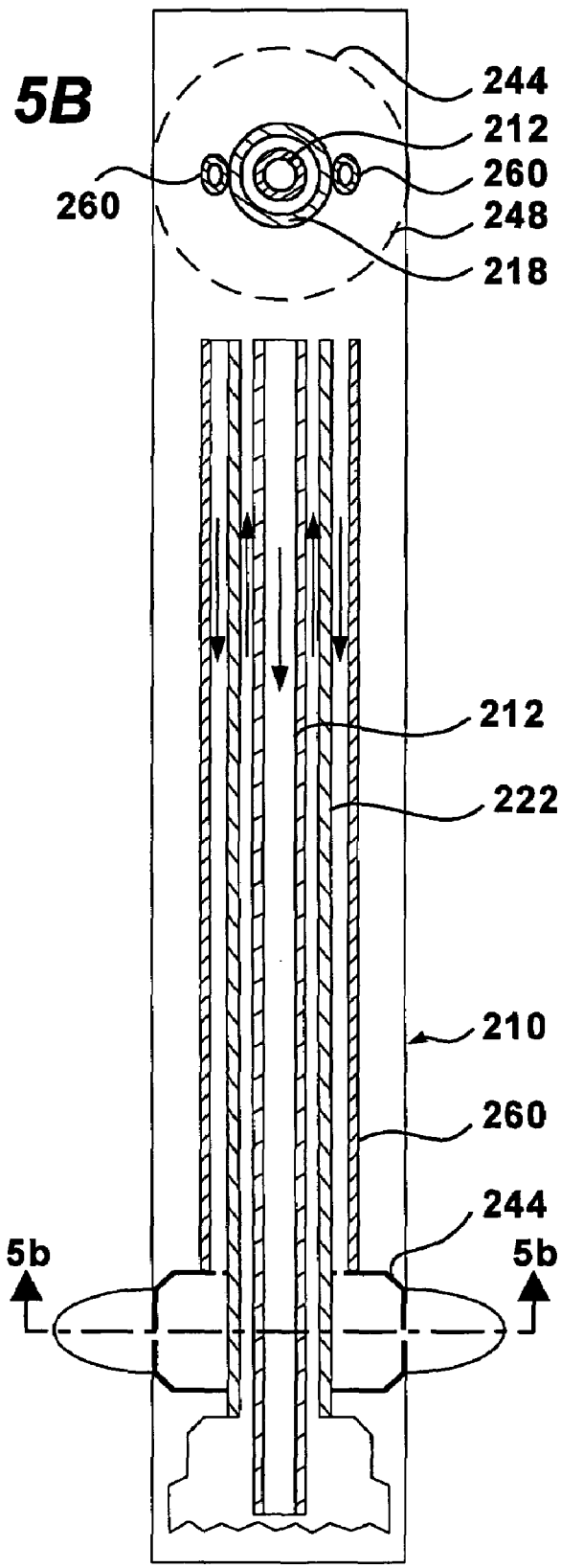
FIG. 5A is a cross-sectional view of the apparatus shown in FIG. 4 taken along line 5A—5A, which illustrates injection of a first treatment fluid into an interval of a subterranean formation.
FIG. 5B is a cross-sectional view of the apparatus shown in FIG. 5A taken along line 5B—5B and also illustrating one pair of conduits utilized in this embodiment of the invention.

The expandable bladder 244 is secured to an end of each of the conduits in the first pair of conduits 260 and to the outer surface 222 of the second tube 218 by the same methods discussed above with reference to the other embodiments. The expandable bladder 244 has communication ports 246 and exit ports 248, which operate in the same manner as the corresponding communication and exit ports 46, 48. The consolidation agent is preferably pumped down through the conduits 260 and injected into the production zone through the expandable bladder 244, as shown in FIG. 5A.

The expandable bladder 250 is secured to an end of each of the conduits in the second pair of conduits 262 and to the outer surface 222 of the second tube 218 by the same methods discussed above with reference to the other embodiments. The expandable bladder 250 has communication ports 252 and exit ports 254, which operate in the same manner as the corresponding communication and exit ports 52, 54. The overflush fluid is preferably pumped down through the conduits 262 and injected into the production zone through the expandable bladder 250, as shown in FIG. 6A. Preferably, the overflush fluid is injected into the formation behind the consolidation agent as discussed above with reference to the other embodiments of the present invention and illustrated in FIG. 6A.

The embodiment of the present invention shown in FIGS. 4–6 can also be used to deliver a single treatment fluid to multiple intervals as discussed above. In this application of this device the treatment fluid is pumped down all four conduits simultaneously. This embodiment of the present invention can also be used in zone isolation.

Therefore, the present invention is well adapted to carry out the objects and attain the ends and advantages mentioned as well as those that are inherent therein. While numerous changes may be made by those skilled in the art, e.g., changing the number of nested tubes utilized in the embodiments of FIGS. 1–3 or the number of conduits in the embodiment of FIGS. 4–6, such changes are encompassed within the spirit of this invention as defined by the appended claims.

What is claimed is:

1. A method for delivering a treatment fluid to an interval of a subterranean formation while drilling, comprising the steps of:
    (a) delivering a drill-in fluid to a drill bit drilling a well bore in the interval;
    (b) removing drill cuttings from the well bore; and
    (c) injecting the treatment fluid into the interval, wherein step (c) is performed simultaneously with steps (a) and (b).

2. A method for delivering a treatment fluid to an interval according to claim 1, further comprising the step of injecting another treatment fluid into the interval following step (c) and simultaneously with steps (a) and (b).

3. A method for delivering a treatment fluid to an interval according to claim 2, wherein the treatment fluid injected in step (c) comprises a consolidation agent and the another treatment fluid comprises an overflush fluid.

4. A method for delivering a treatment fluid to an interval according to claim 3, wherein the consolidation agent comprises a curable epoxy resin.

5. A method for delivering a treatment fluid to an interval according to claim 4, wherein the consolidation agent comprises a resin selected from the group consisting of a phenolic resin, a furan resin, or a mixture of phenolic and furan resins.

6. A method for delivering a treatment fluid to an interval according to claim 5, wherein the consolidation agent further comprises a hardener, a silane coupling agent, a surfactant and a diluent.

7. A method for delivering a treatment fluid to an interval according to claim 6, wherein the diluent comprises an aqueous soluble solvent and the concentration ratios of resin to solvent are between 1 to 0.2 and 1 to 20.

8. A method for delivering a treatment fluid to an interval according to claim 6, wherein the consolidation agent further comprises a flexibilizer compound.

9. A method for delivering a treatment fluid to an interval according to claim 3, wherein the overflush fluid comprises a completion brine and a surfactant.

10. A method for delivering a treatment fluid to an interval according to claim 1, wherein the treatment fluid is selected from the group consisting of tackifying agents, acids, gel breakers, enzymes, hydrolyzable esters, corrosion inhibitors, paraffin inhibitors, and scale inhibitors.

11. An apparatus for delivering a treatment fluid to an interval of a subterranean formation while drilling, comprising:
- a first tube defined by an inner flow path and an outer surface;
- a second tube defined by an inner surface and an outer surface, wherein the first tube is coaxially disposed within the second tube and a first annulus is formed between the outer surface of the first tube and the inner surface of the second tube;
- a third tube defined by an inner surface and an outer surface, wherein the second tube is coaxially disposed within the third tube and a second annulus is formed between the outer surface of the second tube and the inner surface of the third tube; and
- an expandable bladder coupled to the outer surface of the second tube and an end of the third tube.

12. An apparatus for delivering a treatment fluid to an interval according to claim 11, further comprising a fourth tube defined by an inner surface and an outer surface, wherein the third tube is coaxially disposed within the fourth tube and a third annulus is formed between the outer surface of the third tube and the inner surface of the fourth tube.

13. An apparatus for delivering a treatment fluid to an interval according to claim 12, further comprising an expandable bladder coupled to the outer surface of the third tube and an end of the fourth tube.

14. An apparatus for delivering a treatment fluid to an interval according to claim 13, wherein the expandable bladder coupled to the outer surface of the third tube and an end of the fourth tube comprises at least one fluid communication port, which opens in communication with the third annulus and at least one exit port that opens to a well bore formed in the subterranean formation.

15. An apparatus for delivering a treatment fluid to an interval according to claim 14, wherein another treatment fluid is pumped down the third annulus under pressure and the at least one communication port and the at least one exit port in the expandable bladder coupled to the outer surface of the third tube and an end of the fourth tube open in response to the fluid pressure.

16. An apparatus for delivering a treatment fluid to an interval according to claim 11, wherein the expandable bladder comprises at least one fluid communication port, which opens in communication with the second annulus and at least one exit port that opens to a well bore formed in the subterranean formation, and wherein the expandable bladder further couples to an end of the third tube.

17. An apparatus for delivering a treatment fluid to an interval according to claim 16, wherein the treatment fluid is pumped down the second annulus under pressure and the at least one communication port and the at least one exit port in the expandable bladder open in response to the pressure.

18. An apparatus for delivering a treatment fluid to an interval according to claim 11, further comprising a drill bit selected from the group consisting of a rotary drill bit and a hydraulically operated bit, and wherein the drill bit is coupled to the an end of the first tube and an end of the second tube.

19. An apparatus for delivering a treatment fluid to an interval according to claim 18, wherein a drill-in fluid is delivered to the drill bit through the inner flow path formed within the first tube and drill cuttings are removed from the drill bit through the first annulus.

20. An apparatus for delivering a treatment fluid to an interval according to claim 18, wherein a drill-in fluid is delivered to the drill bit through the first annulus and drill cuttings are removed from the drill bit through the internal flow path formed within the first tube.

21. An apparatus for delivering a treatment fluid to an interval according to claim 11, wherein the treatment fluid is selected from the group consisting of consolidation agents, tackifying agents, acids, gel breakers, enzymes, hydrolyzable esters, corrosion inhibitors, paraffin inhibitors, scale inhibitors and overflush fluids.

22. An apparatus for delivering a treatment fluid to an interval of a subterranean formation while drilling, comprising:
- a first tube defined by an inner flow path and an outer surface;
- a second tube defined by an inner surface and an outer surface, wherein the first tube is coaxially disposed within the second tube and a first annulus is formed between the outer surface of the first tube and the inner surface of the second tube;
- at least one conduit secured to the outer surface of the second tube; and
- at least one expandable bladder coupled to the outer surface of the second tube and an end of the at least one conduit.

23. An apparatus for delivering a treatment fluid to an interval according to claim 22, wherein two pairs of oppositely disposed conduits are secured to the outer surface of the second tube with the at least one expandable bladder being secured to an end of each conduit of one of the conduit pairs.

24. An apparatus for delivering a treatment fluid to an interval according to claim 23, wherein one pair of oppositely disposed conduits is circumferentially offset from the other pair of oppositely disposed conduits by approximately 90 degrees.

25. An apparatus for delivering a treatment fluid to an interval according to claim 24, wherein another expandable bladder is coupled to an end of each conduit of the other conduit pair.

26. An apparatus for delivering a treatment fluid to an interval according to claim 25, wherein the expandable bladders are axially disposed from one another.

27. An apparatus for delivering a treatment fluid to an interval according to claim 22, wherein the at least one expandable bladder comprises at least one fluid communication port, which opens in communication with the at least one conduit and at least one exit port that opens to a well bore formed in the subterranean formation.

28. An apparatus for delivering a treatment fluid to an interval according to claim 27, wherein the treatment fluid is pumped down the at least one conduit under pressure and the at least one communication port and the at least one exit port in the at least one expandable bladder open in response to the pressure.

29. An apparatus for delivering a treatment fluid to an interval according to claim 22, further comprising a drill bit selected from the group consisting of a rotary drill bit and a hydraulically operated bit, and wherein the drill bit is coupled to an end of the first tube and an end of the second tube.

30. An apparatus for delivering a treatment fluid to an interval according to claim 29, wherein a drill-in fluid is delivered to the drill bit through the inner flow path formed within the first tube and drill cuttings are removed from the drill bit through the first annulus.

31. An apparatus for delivering a treatment fluid to an interval according to claim 22, wherein the treatment fluid is selected from the group consisting of consolidation agents, tackifying agents, acids, gel breakers, enzymes, hydrolyzable esters, corrosion inhibitors, paraffin inhibitors, scale inhibitors and overflush fluids.

\* \* \* \* \*